United States Patent
Onizuka

(10) Patent No.: US 12,397,591 B2
(45) Date of Patent: Aug. 26, 2025

(54) TIRE

(71) Applicant: BRIDGESTONE CORPORATION, Tokyo (JP)

(72) Inventor: Nobuyuki Onizuka, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 18/551,540

(22) PCT Filed: Nov. 24, 2021

(86) PCT No.: PCT/JP2021/043055
§ 371 (c)(1),
(2) Date: Sep. 20, 2023

(87) PCT Pub. No.: WO2023/276188
PCT Pub. Date: Jan. 5, 2023

(65) Prior Publication Data
US 2024/0166001 A1    May 23, 2024

(30) Foreign Application Priority Data
Jun. 30, 2021   (JP) ................. 2021-109729

(51) Int. Cl.
*B60C 19/00*    (2006.01)

(52) U.S. Cl.
CPC ........ *B60C 19/00* (2013.01); *B60C 2019/004* (2013.01)

(58) Field of Classification Search
CPC ............. B60C 19/00; B60C 2019/004; B60C 23/0444; B60C 23/0452; H01Q 1/2241
See application file for complete search history.

(56) References Cited

U.S. PATENT DOCUMENTS

| | | | |
|---|---|---|---|
| 5,218,861 A | 6/1993 | Brown et al. | |
| 5,388,627 A * | 2/1995 | Nakada | B60C 13/02 152/555 |
| 6,228,929 B1 * | 5/2001 | Larson | C08L 23/22 524/495 |

(Continued)

FOREIGN PATENT DOCUMENTS

| | | |
|---|---|---|
| EP | 2275286 A1 | 1/2011 |
| EP | 3237237 A1 | 11/2017 |

(Continued)

OTHER PUBLICATIONS

English machine translation of WO-2019076500-A1. (Year: 2019).*

(Continued)

*Primary Examiner* — Robert C Dye
(74) *Attorney, Agent, or Firm* — KENJA IP LAW PC

(57) ABSTRACT

The tire 1 according to this disclosure is a tire having a carcass 3 comprised of at least one carcass ply 3a extending between a pair of bead portions 13 through a pair of sidewall portions 12. The tire 1 comprises: a conductive member 21 embedded in a tire side portion 14 comprised of the sidewall portion 12 and the bead portion 13, either outside or inside the carcass 3 in the tire width direction, and extending over at least partial area in the tire circumferential direction and at least partial area in the tire radial direction in the tire side portion 14; and at least one IC chip 22 embedded in the tire side portion 14, and at least one of the at least one IC chip 22 is a contact IC chip 22c that contacts the conductive member without a mechanical connection.

14 Claims, 3 Drawing Sheets

(56) References Cited

U.S. PATENT DOCUMENTS

| | | | |
|---|---|---|---|
| 6,302,173 B1* | 10/2001 | Mizuno | B60C 1/0016 152/152.1 |
| 6,546,982 B1* | 4/2003 | Brown | B60C 23/0433 29/601 |
| 11,007,826 B2 | 5/2021 | Nagayoshi | |
| 11,981,166 B2 | 5/2024 | Destraves et al. | |
| 2002/0148545 A1* | 10/2002 | Nanni | B60C 1/0016 524/495 |
| 2007/0256485 A1* | 11/2007 | Rensel | B60C 23/0493 340/447 |
| 2011/0095870 A1* | 4/2011 | Fenkanyn | H04Q 9/00 340/10.3 |
| 2012/0291936 A1 | 11/2012 | Lionetti et al. | |
| 2019/0366780 A1 | 12/2019 | Miklic et al. | |
| 2020/0108671 A1 | 4/2020 | Hosomi | |
| 2021/0001671 A1 | 1/2021 | Cukierman et al. | |

FOREIGN PATENT DOCUMENTS

| | | | | |
|---|---|---|---|---|
| EP | 3237237 B1 * | 10/2019 | | B60C 11/24 |
| EP | 3578395 A1 | 12/2019 | | |
| JP | 2004082775 A | 3/2004 | | |
| JP | 2012240680 A | 12/2012 | | |
| JP | 2016539047 A | 12/2016 | | |
| JP | 2017132291 A | 8/2017 | | |
| JP | 2019137150 A | 8/2019 | | |
| JP | 2020055452 A | 4/2020 | | |
| JP | 2020055453 A | 4/2020 | | |
| JP | 2021514891 A | 6/2021 | | |
| WO | WO-2019076500 A1 * | 4/2019 | | B29D 30/0061 |
| WO | 2019175509 A1 | 9/2019 | | |
| WO | 2021058905 A1 | 4/2021 | | |

OTHER PUBLICATIONS

Dec. 14, 2023, International Preliminary Report on Patentability issued in the International Patent Application No. PCT/JP2021/043055.

Jan. 11, 2022, International Search Report issued in the International Patent Application No. PCT/JP2021/043055.

Jul. 16, 2024, search result of the Extended European Search Report issued by the European Patent Office in the corresponding European Patent Application No. 21948491.2.

* cited by examiner

TIRE

TECHNICAL FIELD

This disclosure relates to a tire.

BACKGROUND

The configuration in which a communication device such as an RF tag is embedded in a tire has been known. For example, the PTL 1 discloses a tire with an RF tag embedded within the tire side portion.

CITATION LIST

Patent Literature

PTL 1: JP 2016-539047 A

SUMMARY

Technical Problem

However, in general, if an RF tag, in which the IC chip and antenna are mechanically connected by solder or other means, is embedded in the tire as it is, there is a risk of durability degradation due to wire breakage, etc. at such connection. For reinforcement, an RF tag could be coated with rubber or resin in advance, however this would complicate the structure and require advanced technology.

Therefore, it is an object of this disclosure to provide a tire which can improve the durability of the communication device with a simple configuration.

Solution to Problem

The tire according to this disclosure is,
a tire having a carcass comprised of at least one carcass ply extending between a pair of bead portions through a pair of sidewall portions, wherein the tire comprises:
a conductive member embedded in a tire side portion comprised of the sidewall portion and the bead portion, either outside or inside the carcass in the tire width direction, and extending over at least partial area in the tire circumferential direction and at least partial area in the tire radial direction in the tire side portion; and
at least one IC chip embedded in the tire side portion, wherein at least one of the at least one IC chip is a contact IC chip that contacts the conductive member without a mechanical connection.

Advantageous Effect

According to this disclosure, it is possible to provide a tire which can improve the durability of the communication device with a simple configuration.

BRIEF DESCRIPTION OF THE DRAWINGS

In the accompanying drawings.

DETAILED DESCRIPTION

Figure 1:
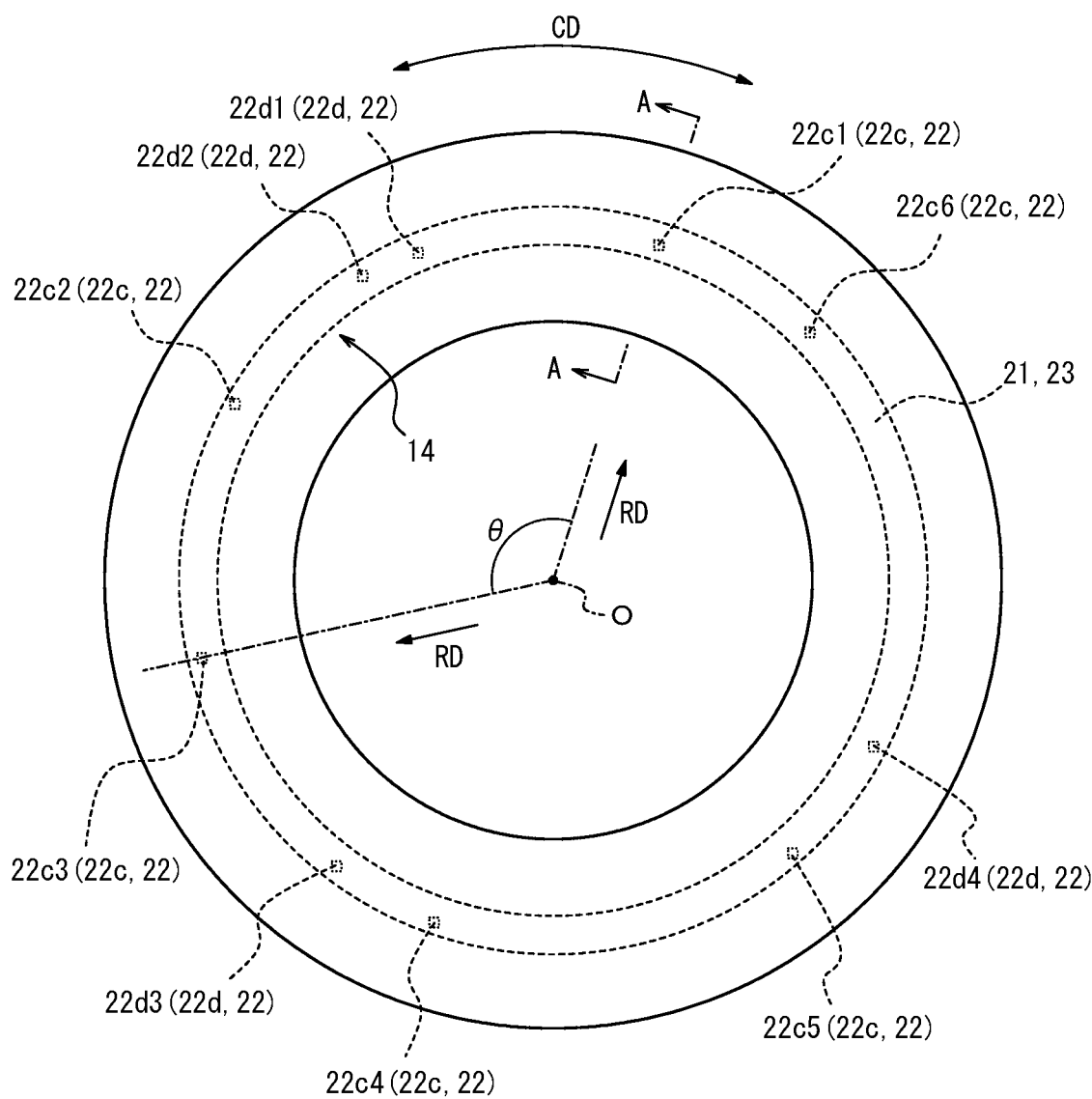
FIG. 1 is a side view of the tire side portion of the tire according to the first embodiment of this disclosure, viewed from the outside in the tire width direction.

The tire according to this disclosure can be suitably used for any type of pneumatic tire, for example, the pneumatic tire for passenger cars, trucks, and buses, etc.

The following is an illustrative description of the embodiments of the tire according to this disclosure with reference to the drawings.

In each figure, common components and parts are marked with the same reference numerals/signs. In some drawings, the tire width direction is indicated by the sign "WD", the tire radial direction is indicated by the sign "RD", and the tire circumferential direction is indicated by the sign "CD". In this document, the side closer to the tire lumen is referred to as the "inside the tire" and the side farther from the tire lumen is referred to as the "outside the tire".

Figure 2:
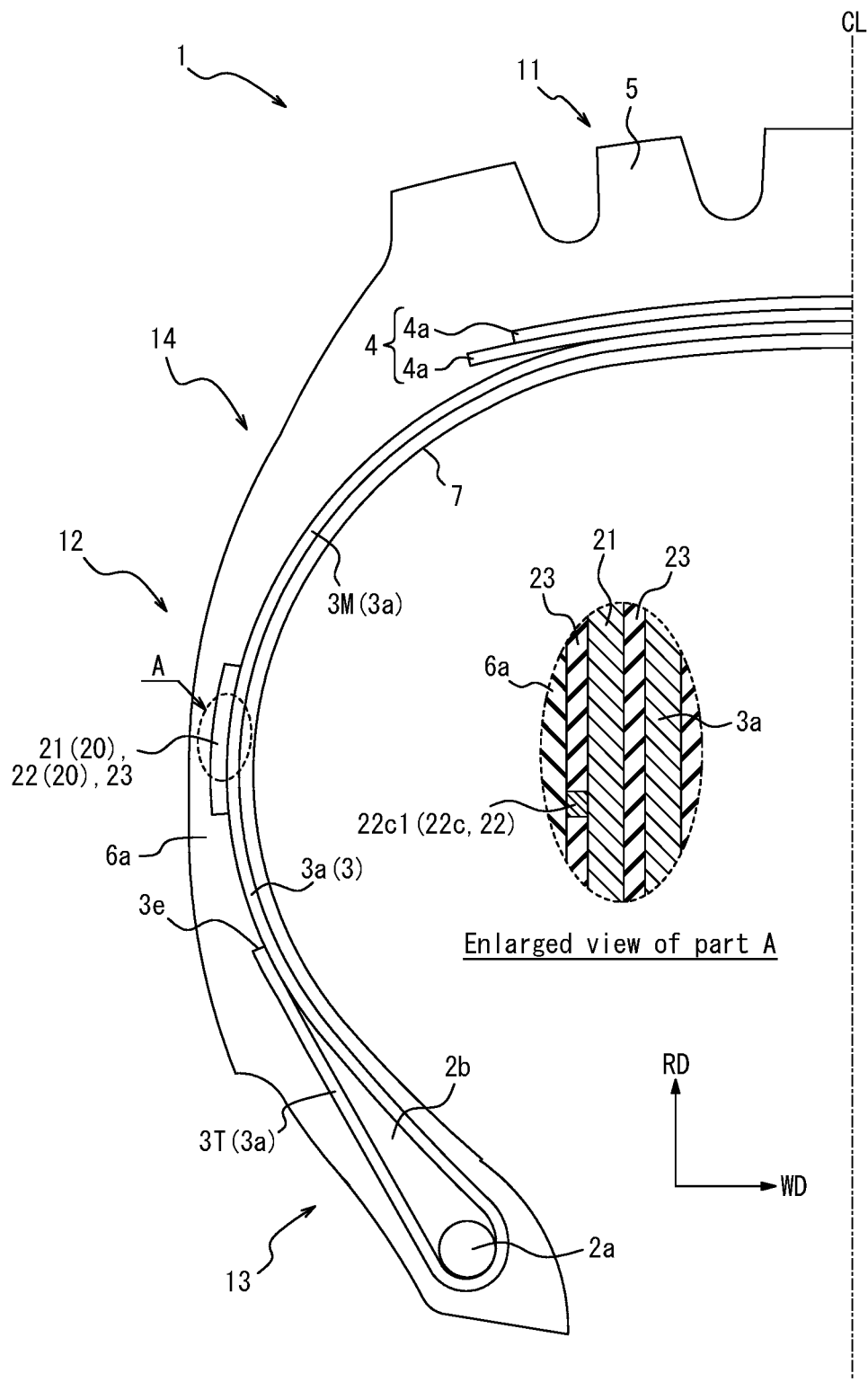
FIG. 2 is a cross-sectional view in the tire width direction, illustrating a portion of the tire of FIG. 1 in cross-section along the A-A line in FIG. 1, together with a partially enlarged view.
Figure 3:
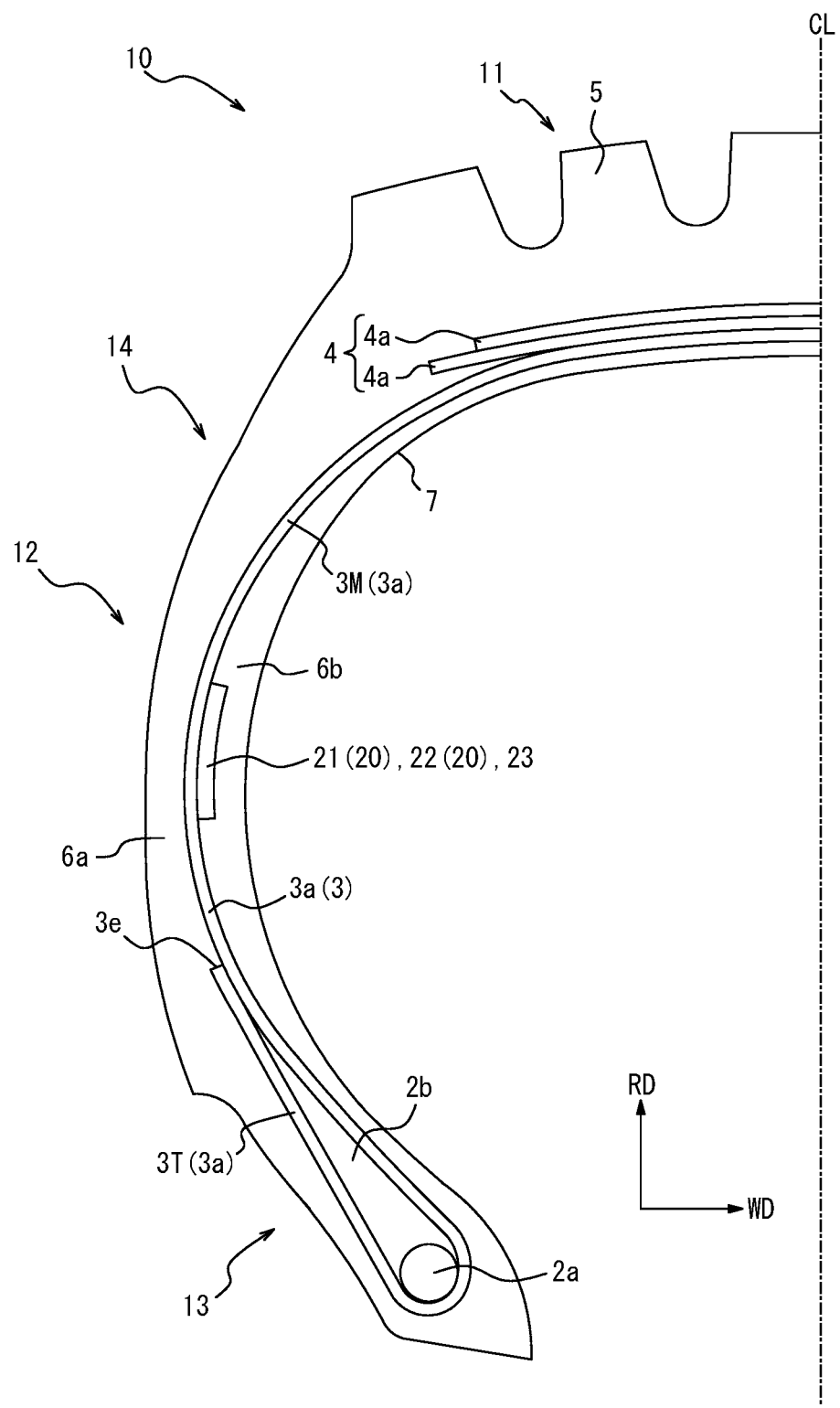
FIG. 3 is a cross-sectional view in the tire width direction, illustrating a portion of the tire according to the second embodiment of this disclosure by the similar cross-section along the A-A line in FIG. 1.

FIGS. 1 and 2 illustrate a tire 1 according to the first embodiment of this disclosure. FIG. 1 is a side view of the tire side portion of the tire according to the first embodiment of this disclosure, viewed from the outside in the tire width direction. FIG. 2 is a cross-sectional view in the tire width direction, illustrating a portion (specifically, the portion on one side relative to the tire equatorial plane CL) of the tire of FIG. 1 in cross-section along the A-A line in FIG. 1, together with a partially enlarged view. FIG. 3 is a cross-sectional view in the tire width direction, illustrating a portion of the tire 10 according to the second embodiment of this disclosure by the similar cross-section along the A-A line in FIG. 1.

The tire 1 and the tire 10 according to embodiments of this disclosure may be configured as any type of tire.

Hereafter, unless otherwise noted, the positional relationship and dimensions of each element shall be measured under the reference condition, with the tire mounted on the applicable rim, filled with the prescribed internal pressure, and unloaded. When the tire is mounted on the applicable rim, filled with the prescribed internal pressure, and loaded with the maximum load, the width of the contact patch in contact with the road surface in the tire width direction is referred to as the ground contact width of the tire, and the edge of the ground contact patch in the tire width direction is referred to as the ground contact edge.

As used herein, the term "applicable rim" refers to the standard rim in the applicable size (Measuring Rim in ETRTO's STANDARDS MANUAL and Design Rim in TRA's YEAR BOOK) as described or as may be described in the future in the industrial standard, which is valid for the region in which the tire is produced and used, such as JATMA YEAR BOOK of JATMA (Japan Automobile Tyre Manufacturers Association) in Japan, STANDARDS MANUAL of ETRTO (The European Tyre and Rim Technical Organization) in Europe, and YEAR BOOK of TRA (The Tire and Rim Association, Inc.) in the United States. For sizes not listed in these industrial standards, the term "applicable rim" refers to a rim with a width corresponding to the bead width of the pneumatic tire. The term "applicable rim" includes current sizes as well as future sizes to be listed in the aforementioned industrial standards. An example of the "size as described in the future" could be the sizes listed as "FUTURE DEVELOPMENTS" in the ETRTO 2013 edition.

As used herein, the term "prescribed internal pressure" refers to the air pressure (maximum air pressure) corresponding to the maximum load capacity of a single wheel in the applicable size and ply rating, as described in the aforementioned JATMA YEAR BOOK and other industrial standards. For sizes not listed in the aforementioned industrial standards, the term "prescribed internal pressure" refers to the air pressure (maximum air pressure) corresponding to the maximum load capacity specified for each vehicle in which the tire is mounted. Further, as used herein, the term "maximum load" means the load corresponding to the maximum load capacity in the tire of the applicable size described in the aforementioned industrial standards, or, for sizes not listed in the aforementioned industrial standards, the load corresponding to the maximum load capacity specified for each vehicle in which the tire is mounted.

First Embodiment

As illustrated in FIG. 2, the tire 1 according to the first embodiment of this disclosure comprises a tread portion 11, a pair of sidewall portions 12 extending inwardly in the tire radial direction from both ends of the tread portion 11 in the tire width direction, and a pair of bead portions 13 provided at the inner end of each sidewall portion 12 in the tire radial direction. The tread portion 11 is the portion of the tire 1 that extends in the tire width direction between a pair of the ground contact edges. The bead portion 13 is configured to be in contact with the rim when the tire 1 is mounted on the rim, both at the inside in the tire radial direction and outside in the tire width direction.

The tire 1 has a pair of tire side portions 14 extending inwardly in the tire radial direction from both ends of the tread portion 11 in the tire width direction. The tire side portion 14 comprised of the sidewall portion 12 and the bead portion 13.

Further, the tire 1 also comprises a pair of bead cores 2a, a pair of bead fillers 2b, a carcass 3, a belt 4, a tread rubber 5, a side rubber 6a, and an inner liner 7. The aforementioned sidewall portion 12 is at least the portion extending inwardly in the tire radial direction from the belt 4 and extending outwardly in the tire radial direction from the bead portion 13.

Each of the bead cores 2a is embedded in the corresponding bead portion 13. The bead core 2a comprises a plurality of bead wires with rubber coating around them. However, the bead core 2a may comprise a single bead wire. The bead wire is suitably composed of metal (e.g., steel). The bead wire can, for example, be made of monofilament or stranded wire. The bead wire may be composed of organic or carbon fibers.

Each of the bead fillers 2b is positioned outside relative to the corresponding bead core 2a in the tire radial direction. The bead filler 2b extends tapering outward in the tire radial direction. The bead filler 2b is made of rubber, for example.

The bead filler is sometimes referred to as "stiffener".

For example, when the tire 1 is configured as a pneumatic tire for a truck/bus, although not illustrated, the bead filler 2b may comprises a plurality of (e.g., two) bead filler sections. The plurality of bead filler sections can differ in hardness from each other, for example. The plurality of bead filler sections are arranged (stacked) along the tire radial direction, for example.

The carcass 3 straddles between a pair of bead cores 2a and extends toroidally through a pair of sidewall portions 12 and a tread portion 11. In other words, the carcass 3 extends between a pair of bead portions 13 through a pair of sidewall portions 12. The carcass 3 is comprised of at least one carcass ply 3a (one ply in the example in FIG. 2). Each carcass ply 3a includes one or more carcass cords and coating rubber covering the carcass cords. The carcass cord can be formed, for example, with monofilament or stranded wire.

The carcass cord may be composed of organic fibers made of polyester, nylon, rayon, aramid, etc., or may be composed of metal (e.g., steel). When the tire 1 is configured as a pneumatic tire for a truck/bus, the carcass cord is suitably composed of metal (e.g., steel). When the tire 1 is configured as a passenger vehicle pneumatic tire, the carcass cord is suitably composed of organic fibers made of polyester, nylon, rayon, aramid, or the like.

The carcass ply 3a comprises a ply body portion 3M positioned between a pair of bead cores 2a. The carcass ply 3a may further comprise ply turn-up portions 3T, which are folded from both ends of the ply body portion 3M around the bead cores 2a from the inside to the outside in the tire width direction. However, the carcass ply 3a does not have to comprise the ply turn-up portions 3T. The carcass 3 is suitably of a radial structure, but may also be of a bias structure.

The belt 4 is disposed outside the crown portion of the carcass 3 in the tire radial direction. The belt 4 comprises at least one (two in the example in FIG. 2) belt layers 4a. Each belt layer 4a includes one or more belt cords and coating rubber covering the belt cords. The belt cord can be formed, for example, with monofilament or stranded wire. The belt cord may be composed of metal (e.g., steel) or of organic fibers comprising polyester, nylon, rayon, aramid, etc.

The tread rubber 5 is positioned in the tread portion 11, outside the belt 4 in the tire radial direction. The tread rubber 5 constitutes the tread surface, which is the outer surface of the tread portion 11 in the tire radial direction. The tread pattern is formed on the tread surface.

The side rubber 6a is positioned in the sidewall portion 12, outside the carcass 3 in the tire width direction. The side rubber 6a constitutes the outer surface of the sidewall portion 12 in the tire width direction. The side rubber 6a is integrally formed with the tread rubber 5.

The inner liner 7 may be positioned on the tire inside of the carcass 3, e.g., may be laminated on the tire inside of the carcass 3. The inner liner 9 is made of butyl rubber with low air permeability, for example. The butyl rubber includes, for example, butyl rubber and its derivative, halogenated butyl rubber. The inner liner 9 is not limited to butyl rubber, but can be made of other rubber compositions, resins, or elastomers.

Regarding the tire 1 according to this embodiment, although FIG. 2 illustrates only one side of the tire 1 with respect to the tire equatorial plane CL, the configuration of the tire 1 other than the conductive member 21 and the IC chip 22 (that is, when the portion of the tire 1 excluding the conductive member 21 and the IC chip 22 described below is referred to as the tire body portion, the configuration of the tire body portion) is symmetrical with respect to the tire equatorial plane CL. In other words, in the configuration of the tire 1, the other side with respect to the tire equatorial plane of the tire is equivalent to the configuration illustrated in FIG. 2. However, the configuration of the tire 1 may be asymmetric with respect to the tire equatorial plane CL.

In addition, the configuration of the tire 1 other than the conductive member 21 and the IC chip 22 described below may be different from those described above, as long as it does not depart from the purpose of the present disclosure.

Next, the conductive member 21 and the IC chip 22, embedded in the tire side portion 14 comprised of the sidewall portion 12 and the bead portion 13 in this embodiment, will be described.

In this embodiment, the IC chip 22 (more specifically, at least the contact IC chip 22d, described below) and the conductive member 21 can work together to configure a communication device 20 that enables communication with the outside world, with the conductive member 21 functioning as an antenna. In other words, when compared to the general RF tag (also commonly referred to as an RFID tag), in this embodiment, the IC chip 22 and the conductive member 21 function as the IC chip of the RF tag and the antenna of the RF tag, respectively, so that the IC chip 22 and the conductive member 21 can work together to configure the communication device 20.

In this embodiment, the communication device 20, comprising the IC chip 22 (more specifically, at least the contact IC chip 22d, described below) and the conductive member 21, is capable of wireless communication with a predetermined external device (e.g., a reader or reader/writer) located outside the tire 1.

The communication device 20 is suitably configured as a passive type, however, may also be configured as an active type.

In this embodiment, as illustrated in FIGS. 1 and 2, the conductive member 21 is embedded in the tire side portion 14 (more precisely, inside the tire side portion 14) composed of the sidewall portion 12 and the bead portion 13. More specifically, as illustrated in FIG. 2, the conductive member 21 is embedded in the tire side portion 14, outside the carcass 3 (more specifically, the ply body portion 3M of the carcass ply 3a) in the tire width direction. In this example, the conductive member 21 is embedded in the side rubber 6a (i.e., inside the side rubber 6a) forming the sidewall portion 12.

In the example illustrated in FIG. 2, the conductive member 21 is embedded in the outside the carcass ply 3a in the tire width direction so that at least part of the conductive member 21 in the tire radial direction contacts the carcass ply 3a that constitutes the carcass 3. However, in this example, the conductive member 21 may not be in contact with the carcass ply 3a, as long as the entire conductive member 21 is positioned outside the carcass ply 3a (and thus the carcass 3) in the tire width direction.

In this embodiment, the conductive member 21 is formed in the form of a strip, having a predetermined width (in FIGS. 1 and 2, the width in the tire radial direction RD) and extending in the longitudinal direction (in FIG. 1, the tire circumferential direction CD). The predetermined width may be constant or vary along the longitudinal direction.

The conductive member 21 may, for example, is made of a plurality of conductive fibers in contact with each other to form a strip. In this case, compared to the case where the conductive member 21 is formed of a strip-shaped metallic plate that can function as an antenna, for example, the conductive member 21 has better communication properties, and also the conductive member 21 is more flexible and easier to be embedded inside the tire 1. More specifically, the conductive member 21 may, for example, be made by laying a number of conductive fibers with the direction of extension approximately aligned as the longitudinal direction of the conductive member 21, or randomly touching each other, to form a strip. However, the conductive member 21 is not limited to the above configuration, but may be formed, for example, of a strip-shaped metallic plate, etc. that can function as an antenna. The conductive fibers include, for example, steel fibers, stainless steel fibers, carbon fibers, conductive organic fibers such as conductive cotton fibers, etc.

When the conductive member 21 is formed as a strip as described above, its cross-sectional shape in the width direction (equivalent to that of FIG. 2) may be flat or slightly curved.

The conductive member 21 may be embedded in the tire side portion 14 as its outer surface is covered with a coating material 23. In this case, the conductive member 21 is easier to handle, making it easier to embed the conductive member 21 inside the tire side portion 14. The coating material 23 includes, for example, coating rubber and coating resin.

In this embodiment, the conductive member 21 embedded in the tire side portion 14 extends over at least partial area in the tire circumferential direction and at least partial area in the tire radial direction in the tire side portion 14. In other words, the conductive member 21 has a predetermined width in the tire radial direction and extends with a predetermined length in the tire circumferential direction (see FIG. 1).

In the example illustrated in FIG. 1, the conductive member 21 extends over an entire circumference in the tire circumferential direction in the tire side portion 14. However, the conductive member 21 may not extend over the entire circumference in the tire circumferential direction in the tire side portion 14. For example, the conductive members 21 may extend only over a partial area in the tire circumferential direction in the tire side portion 14, a plurality of divided conductive members 21 may extend intermittently along the tire circumferential direction, or each of the plurality of conductive members 21 extending only in a partial area in the tire circumferential direction may be arbitrarily embedded within the tire side portion 14 so that they do not contact each other. However, from the standpoint of reliability against failure of the communication device 20 of which the conductive member 21 is a part, and from the standpoint of the appearance of the tire side portion 14, it is most preferable that the conductive member 21 extends over the entire circumference in the tire circumferential direction in the tire side portion 14.

The width of the conductive member 21 (or each conductive member 21 when comprising more than one) in the tire radial direction is not limited, but is preferably 10 to 40% of the tire cross-sectional height. If the width of the conductive member 21 in the tire radial direction is 10% or more of the tire cross-sectional height, the IC chip 22 can be brought into contact with the conductive member more easily, and if the width is 40% or less, the increase in tire weight can be properly controlled. From the same perspective, it is more preferable that the width of the conductive member 21 in the tire radial direction is 20 to 30% of the tire cross-sectional height.

In this embodiment, the width of the conductive member 21 in the tire radial direction is constant along the tire circumferential direction (see FIG. 1), however it may not be constant.

The length of the conductive member 21 (or each conductive member 21 when comprising more than one) along the tire circumferential direction is not particularly limited, but is preferably 90 degrees or more (i.e., ¼ or more of the entire tire circumference) as the central angle θ around the tire rotation axis O (see FIG. 1). If the length of the conductive member 21 along the tire circumferential direction is 90 degrees or more as the central angle θ, the IC chip 22 can be brought into contact with the conductive member more easily. From the same perspective, the length of the conductive member 21 along the tire circumferential direction is, as the central angle θ, more preferably 180 degrees or more, even more preferably 270 degrees or more, and most preferably 360 degrees (that is, the entire tire circumference) which is as illustrated in FIG. 1.

The position of the conductive member 21 in the tire radial direction in the tire side portion 14 (i.e., inside the belt 4 in the tire radial direction) is not particularly limited, however the entire conductive member 21 is preferably embedded outside the bead core 2a in the tire radial direction, more preferably embedded outside the outer edge 3e in the tire radial direction of the ply turn-up portion 3T in the tire radial direction.

As illustrated in FIG. 2, in this example, the entire conductive member 21 is embedded at a location outside the outer edge 3e in the tire radial direction of the ply turn-up portion 3T in the tire radial direction and spanning over approximately the tire maximum width position.

In this embodiment, as illustrated in FIGS. 1 and 2 (the enlarged view of part A), at least one (in this example, a plurality of) IC chip 22 is embedded in the tire side portion 14 (more precisely, inside the tire side portion 14). More specifically, as illustrated in FIG. 2, at least one (in this example, a plurality of) IC chip 22 is embedded in the tire side portion 14, outside the carcass 3 (more specifically, the ply body portion 3M of the carcass ply 3a) in the tire width direction. In this example, as illustrated in the enlarged view of part A in FIG. 2, at least one (in this example, a plurality of) IC chip 22 is embedded in a coating material 23 covering the conductive member 21.

As illustrated in FIGS. 1 and 2 (the enlarged view of part A), each IC chip 22 is preferably embedded in a position that approximately corresponds to the conductive member 21 in the tire circumferential direction and the tire radial direction.

In this embodiment, at least one (in this example, a plurality) of the at least one IC chip 22 is in contact with the conductive member 21 without a mechanical connection, as illustrated in the enlarged view of part A in FIG. 2.

In this document, the IC chip 22 "contacts (is in contact with) the conductive member 21 without a mechanical connection" means that the IC chip 22 does not adhere (is not adhered) (i.e., is not mechanically connected) to the conductive member 21 by, for example, solder, etc., however merely contacts (is in contact with) the conductive member 21. Hereinafter, to contact (being in contact) without a mechanical connection is also referred to simply as "to contact (being in contact)" in this document.

In this document, the IC chip 22 that contacts (or is in contact with) the conductive member 21 without a mechanical connection is referred to as the "contact IC chip 22c", and the IC chip 22 that does not contact (or is not in contact with) the conductive member 21 is referred to as the "non-contact IC chip 22d".

In this embodiment, as described above, at least one of the at least one (in this example, a plurality of) IC chip 22 is a contact IC chip 22c, which contacts the conductive member 21 without a mechanical connection.

In this disclosure, the "IC chip 22" refers to an IC chip 22 that does not have a separate antenna component functioning as an antenna within it.

When the IC chip 22 is electrically coupled to the conductive member 21 as an antenna, for example, by contacting with the conductive member 21, the IC chip 22 functions as a part of the communication device 20 comprised of both of them, and operates, for example, by dielectric-electromotive force generated by the radio waves received by the conductive member 21. The IC chip 22, for example, has a controller and a storage section.

The storage section may store any information. For example, the storage section may store the identification information of the tire 1. The identification information of the tire 1 is, for example, the unique identification information of the tire 1 that can identify each tire on a tire-by-tire basis, such as the manufacturer of the tire 1, the manufacturing plant, the date of manufacture, and so on. The storage section may also store the history information of the tire such as the distance traveled, number of sudden braking, number of sudden starts, number of sudden turns, etc. In addition, for example, sensor(s) detecting tire internal temperature, tire internal pressure, tire acceleration, etc. may be provided in the tire lumen, and the storage section may store the detection information detected by the sensor(s). In this case, the communication device 20 comprised of the IC chip 22 and the conductive member 21 can wirelessly communicate with the sensor(s) through the conductive member 21 as an antenna to obtain the detection information from the sensor(s).

The controller is configured, for example, to be able to read the information from the storage section.

When the communication device 20 is composed of the IC chip 22 and the conductive member 21, the communication device 20 is configured to receive, by the conductive member 21, the information transmitted by radio waves or magnetic fields from a predetermined external device (e.g., a reader or reader/writer) located outside the tire 1. Rectification (in the case of radio waves) or resonance (in the case of magnetic fields) generates electric power in the conductive member 21 of the communication device 20, and the storage section and the controller of the IC chip 22 perform the prescribed operation. For example, the controller reads the information in the storage section and returns (transmits) it to the above prescribed external device from the conductive member 21 by radio waves or magnetic fields. The above prescribed external device receives radio waves or magnetic fields from the communication device 20. The above prescribed external device can acquire the information stored in the storage section of the IC chip 22 of the communication device 20 by retrieving the received information.

When the plurality of IC chips 22 are electrically coupled to the conductive member 21 and function as a part of the communication device 20 comprised of both of them, they are configured to transmit the same information to the above prescribed external device, for example.

In this embodiment, as illustrated in the enlarged view of part A in FIG. 2, at least one (in this example, a plurality of) IC chip 22 is embedded in the coating material 23 covering the conductive member 21, and at least one (in this example, more than one) of the at least one IC chip 22 is in contact with the conductive member 21.

In this case, for example, at least one IC chip 22 can be a contact IC chip 22c that is in contact with the conductive member 21, for example, by pre-coating the surface of the conductive member 21 with the coating material 23 in which at least one, preferably a plurality of IC chips 22 are embedded, and embedding the conductive member 21 coated with the coating material 23 inside the tire side portion 14.

As a method of embedding the conductive member 21 coated with the coating material 23 inside the tire side portion 14, for example, the conductive member 21 coated with the coating material 23 may be placed on a raw tire during the manufacturing of the tire 1, housed inside a tire molding die, and vulcanized.

In this embodiment, although not illustrated in figures, at least one (preferably, a plurality of) IC chip 22 may be embedded in the side rubber 6a forming the sidewall portion 12, so that at least one (preferably, more than one) of the at least one IC chip 22 is in contact with the conductive member 21.

In this case, at least one IC chip 22 can be a contact IC chip 22c that is in contact with the conductive member 21, for example, by embedding the conductive member 21, which is not coated with a coating material 23 or the like, as it is, adjacent to the side rubber 6a in which at least one, preferably a plurality of IC chips 22 are pre-embedded during tire molding.

As a method of embedding the conductive member 21 inside the tire side portion 14, for example, the conductive member 21 may be placed on a raw tire containing the IC chip 22, housed inside a tire molding die, and vulcanized.

In this embodiment, as illustrated in FIG. 1, the tire 1 comprises a plurality of the contact IC chips 22c, and at least two of the plurality of the contact IC chips 22c are embedded at positions spaced apart from each other in the tire circumferential direction.

Further, in this embodiment, as illustrated in FIG. 1, the tire 1 comprises a plurality of the contact IC chips 22c, and at least two of the plurality of the contact IC chips 22c are embedded at positions spaced apart from each other by 90 degrees or more as the central angle θ in the tire circumferential direction.

Furthermore, in this embodiment, as illustrated in FIG. 1, the tire 1 comprises a plurality of the contact IC chips 22c, and at least two of the plurality of the contact IC chips 22c are embedded at positions spaced apart from each other in the tire radial direction.

More specifically, in the example in FIG. 1, the tire 1 comprises ten IC chips 22. Of the ten IC chips 22, six are the contact IC chips 22c (22c1-22c6) and four are the non-contact IC chips 22d (22d1-22d4). All of the six contact IC chips 22c (22c1-22c6) are embedded at positions spaced apart from each other in the tire circumferential direction. For example, the contact IC chips 22c1, 22c3, and 22c5 are embedded at positions spaced apart from each other by 90 degrees or more as the central angle θ in the tire circumferential direction. Further, for example, the contact IC chips 22c1 and 22c5 are embedded at positions spaced apart from each other in the tire radial direction.

Thus, the fact that the tire 1 comprises the plurality of contact IC chips 22c facilitates the continued operation of the communication device 20 comprised of the contact IC chips 22c and the conductive member 21, because even if at least some of them are damaged or failed, the other contact IC chips 22c will function. In addition, the fact that at least two contact IC chips 22c are embedded at positions spaced apart from each other in the tire circumferential direction or the tire radial direction, and in particular, sufficiently spaced apart from each other in the tire circumferential direction, reduces the possibility of damage or failure of both of the two contact IC chips 22c due to the same circumstances, compared to the case where the two contact IC chips 22c are embedded in the same position each other in the tire circumferential direction or the tire radial direction. Thus, the above configuration improves the reliability against failure of the communication device 20 comprised of the contact IC chips 22c and the conductive member 21.

As in the example illustrated in FIG. 1, when the tire 1 also comprises at least one non-contact IC chip 22d (in the example of FIG. 1, the non-contact IC chips 22d1-22d4), at least some of them may be capacitively coupled to the conductive member 21, and as such, it is preferred that at least some of them are capacitively coupled to the conductive member 21. In this case, the non-contact IC chip 22d, which is capacitively coupled to the conductive member 21, can also function as a part of the communication device 20, thereby making the communication device 20 more reliable against failure.

Here, the term "capacitively coupled" means that two conductive members are placed apart from each other and are electrically coupled by the capacitance between them.

In this embodiment, from the viewpoint of ensuring the backup when at least some contact IC chips 22c are damaged or failed, the number of contact IC chips 22c embedded in the tire 1 (more specifically, inside the tire side portion 14) is preferably three or more, and more preferably five or more. On the other hand, from the viewpoint of reducing cost increase, the number of contact IC chips 22c embedded in the tire 1 (more specifically, inside the tire side portion 14) is preferably fifteen or less, and more preferably ten or less.

Here, considering the case where the IC chip 22 is embedded in the coating material 23 of the conductive member 21 or the IC chip 22 is embedded in the side rubber 6a, for example, in order to obtain the tire 1 of this embodiment; if the number of IC chips 22 embedded is increased, even if the embedded positions of the IC chips 22 are not so precisely controlled (in other words, even if they are scattered and embedded roughly to some extent), the number of IC chips 22 that will be the contact IC chips 22c can be increased.

Next, the main effects of the above-mentioned embodiments are summarized below, again as necessary.

First, in this embodiment, the tire comprises the conductive member 21 embedded in the tire side portion 14 comprised of the sidewall portion 12 and the bead portion 13, outside the carcass 3 in the tire width direction, and extending over at least partial area in the tire circumferential direction and at least partial area in the tire radial direction in the tire side portion 14; and at least one IC chip embedded in the tire side portion 14, and at least one of the at least one IC chip 22 is a contact IC chip 22c that contacts the conductive member 21 without a mechanical connection.

This eliminates the need to mechanically connect the IC chip 22 and the antenna, or to cover them collectively with rubber or resin in advance for reinforcement, thus the communication device 20 can be simply configured with the IC chip 22 (more specifically, the contact IC chip 22c, etc.) and the conductive member 21. In addition, since the IC chip 22 is not mechanically connected to the conductive member 21, the risk of disconnection failure, etc. of the connection is reduced and the durability of the communication device 20 is improved. That is, according to this embodiment, it is possible to improve the durability of the communication device 20 with a simple configuration.

Further, according to this embodiment, since the conductive member 21, which functions as an antenna, is embedded in the tire side portion 14, where many metallic members, etc. which could be an obstacle to wireless communication are generally not located, the communication device 20 comprised of the IC chip 22 and the conductive member 21 can be excellent in communication.

In this embodiment, the conductive member 21 may be made of a plurality of conductive fibers in contact with each other to form a strip.

In this case, compared to the case where the conductive member 21 is formed of a strip-shaped metallic plate that can function as an antenna, for example, the conductive member 21 has better communication properties, and also the conductive member 21 is more flexible and easier to be embedded inside the tire 1.

In this embodiment, the conductive member 21 extends entirely in the tire circumferential direction in the tire side portion 14.

In this case, since the number of contact IC chips 22c can be increased compared to the case where the conductive member 21 does not extend entirely in the tire circumferential direction in the tire side portion 14, even if any one of the contact IC chips 22c is damaged or failed, the other contact IC chips 22c can continue to function as a part of the communication device 20 comprised of the contact IC chips 22c and the conductive member 21, thus improving the reliability of the communication device 20 against failure. In addition, compared to the case where the conductive member 21 does not extend entirely in the circumferential direction in the tire side portion 14, the possibility of localized bulging, etc. due to embedding of the conductive member 21 in the tire side portion 14 is reduced, and the appearance defects of the tire 1 can be suppressed. That is, according to this embodiment, the reliability of the communication device 20 against failure can be improved, and the appearance defects due to embedding of the communication device in the tire side portion 14 can be suppressed.

In this embodiment, the tire 1 comprises a plurality of the contact IC chips 22c, and at least two of the plurality of the contact IC chips 22c are embedded at positions spaced apart from each other in the tire circumferential direction.

Further, in this embodiment, the tire 1 comprises a plurality of the contact IC chips 22c, and at least two of the plurality of the contact IC chips 22c are embedded at positions spaced apart from each other by 90 degrees or more as the central angle θ in the tire circumferential direction.

Furthermore, in this embodiment, the tire 1 comprises a plurality of the contact IC chips 22c, and at least two of the plurality of the contact IC chips 22c are embedded at positions spaced apart from each other in the tire radial direction.

In these cases, as mentioned above, it is easier to continue to operate the communication device 20 comprised of the contact IC chips 22c and the conductive member 21, even if at least some of the contact IC chips 22c are damaged or failed. In addition, the fact that at least two contact IC chips 22c are embedded at positions spaced apart from each other in the tire circumferential direction or the tire radial direction reduces the possibility of damage or failure of both of the two contact IC chips 22c due to the same circumstances. Thus, the reliability of the communication device 20 comprised of the contact IC chips 22c and the conductive member 21 against failure is improved. For the same reason, the reliability of the communication device 20 against failure is further improved when at least two contact IC chips 22c are embedded at positions spaced apart from each other by 90 degrees or more as the central angle θ in the tire circumferential direction.

In this embodiment, the IC chip 22 is embedded in a coating material covering the conductive member 21.

In this case, by covering the surface of the conductive member 21 with the coating material 23 in which the IC chip 22 is embedded in advance, the IC chip 22 can be prepared at the same time as the conductive member 21 is prepared, and thus the tire 1 with the IC chip 22 can be efficiently manufactured.

In this embodiment, the IC chip 22 is embedded in a side rubber 6a forming the sidewall portion 12.

In this case, the IC chip 22 can only be embedded in the side rubber 6a (raw rubber) in advance during the tire molding process, and thus the tire 1 with the IC chip 22 can be efficiently manufactured.

Second Embodiment

Next, the tire 10 according to the second embodiment of this disclosure will be described with reference to FIG. 3.

In FIG. 3, the components similar to those illustrated in FIGS. 1 and 2 are given the same reference numerals as in FIGS. 1 and 2, and their descriptions are omitted.

The tire 10 according to the second embodiment of this disclosure differs from the tire 1 according to the first embodiment of this disclosure only in that it comprises a side-reinforcing rubber 6b on the inside of the carcass 3 in the tire width direction in the sidewall portion 12, and the conductive member 21 and the IC chip 22 are embedded in the side-reinforcing rubber 6b, and the other points are the same as the tire 1 according to the first embodiment.

As illustrated in FIG. 3, the tire 10 according to the second embodiment of this disclosure comprises a nearly crescent-shaped side-reinforcing rubber 6b inside the carcass 3 (more specifically, the ply body portion 3M of the carcass ply 3a) in the tire width direction in the sidewall portion 12, between the carcass 3 and the inner liner 7.

In this embodiment, the conductive member 21 and the IC chip 22 are embedded inside the side-reinforcing rubber 6b, more specifically, adjacent to the carcass ply 3a in the example in FIG. 3. In other words, in this embodiment, the conductive member 21 (and the IC chip 22) is embedded inside the carcass 3 in the tire width direction in the tire side portion 14.

This reduces the risk of the communication device 20, comprised of the IC chip 22 and the conductive member 21, being damaged or malfunctioning due to foreign objects outside the tire, as compared to, for example, when the conductive member 21 (and IC chip 22) is embedded outside the carcass 3 in the tire side portion 14 in the tire width direction.

The other configuration and effects of the tire 10 according to this embodiment are the same as those of the tire 1 according to the first embodiment described above.

INDUSTRIAL APPLICABILITY

The tire according to this disclosure can be suitably used for any type of pneumatic tire, for example, pneumatic tire for passenger cars, trucks, and buses, etc.

REFERENCE SIGNS LIST 1, 10 Tire
11 Tread portion
12 Sidewall portion
13 Bead portion
14 Tire side portion
2a Bead core
2b Bead filler
3 Carcass
3a Carcass ply
3M Ply body portion 3T Ply turn-up portion
3e Outer edge in the tire radial direction of ply turn-up portion
4 Belt
4a Belt layer
5 Tread rubber
6a Side rubber
6b Side-reinforcing rubber
7 Inner liner
20 Communication device
21 Conductive member
22 IC chip
22c, 22c1-22c6 Contact IC chip
22d, 22dl-22d4 Non-contact IC chip
23 Coating material of conductive member
CL Tire equatorial plane
WD Tire width direction
RD Tire radial direction
CD Tire circumferential direction
O Tire rotation axis
θ Central angle

The invention claimed is:

1. A tire having a carcass comprised of at least one carcass ply extending between a pair of bead portions through a pair of sidewall portions, wherein the tire comprises:
   a conductive member embedded in a tire side portion comprised of the sidewall portion and the bead portion, either outside or inside the carcass in the tire width direction, and extending over at least partial area in the tire circumferential direction and at least partial area in the tire radial direction in the tire side portion; and
   at least one IC chip embedded in the tire side portion,
   wherein at least one of the at least one IC chip is a contact IC chip that contacts the conductive member without a mechanical connection,
   the conductive member is made of a plurality of conductive fibers in contact with each other to form a strip,
   the tire comprises a plurality of the IC chips, and
   the plurality of the IC chips include the at least one contact IC chip and at least one non-contact IC chip that is free of contact with the conductive member and capacitively coupled to the conductive member.

2. The tire according to claim 1, wherein the conductive member extends around the entire circumference of the tire side portion.

3. The tire according to claim 2, comprising a plurality of the contact IC chips, and
   wherein at least two of the plurality of the contact IC chips are embedded at positions spaced apart from each other in the tire circumferential direction.

4. The tire according to claim 2, comprising a plurality of the contact IC chips, and
   wherein at least two of the plurality of the contact IC chips are embedded at positions spaced apart from each other in the tire radial direction.

5. The tire according to claim 2, wherein the IC chips are embedded in a side rubber forming the sidewall portion.

6. The tire according to claim 2, wherein the IC chips are embedded in a coating material covering the conductive member.

7. The tire according to claim 1, comprising a plurality of the contact IC chips, and
   wherein at least two of the plurality of the contact IC chips are embedded at positions spaced apart from each other in the tire circumferential direction.

8. The tire according to claim 7, wherein the at least two of the plurality of the contact IC chips are embedded at positions spaced apart from each other by 90 degrees or more as the central angle in the tire circumferential direction.

9. The tire according to claim 7, wherein the IC chips are embedded in a side rubber forming the sidewall portion.

10. The tire according to claim 7, wherein the IC chips are embedded in a coating material covering the conductive member.

11. The tire according to claim 1, comprising a plurality of the contact IC chips, and
    wherein at least two of the plurality of the contact IC chips are embedded at positions spaced apart from each other in the tire radial direction.

12. The tire according to claim 1, wherein the IC chips are embedded in a side rubber forming the sidewall portion.

13. The tire according to claim 1, wherein the IC chips are embedded in a coating material covering the conductive member.

14. The tire according to claim 1, wherein the conductive member is made by laying the plurality of conductive fibers with a direction of extension approximately aligned as a longitudinal direction of the conductive member.

\* \* \* \* \*